June 27, 1950  R. H. DICKE  2,512,717
POWER TRANSMISSION
Filed Sept. 30, 1948  4 Sheets-Sheet 1
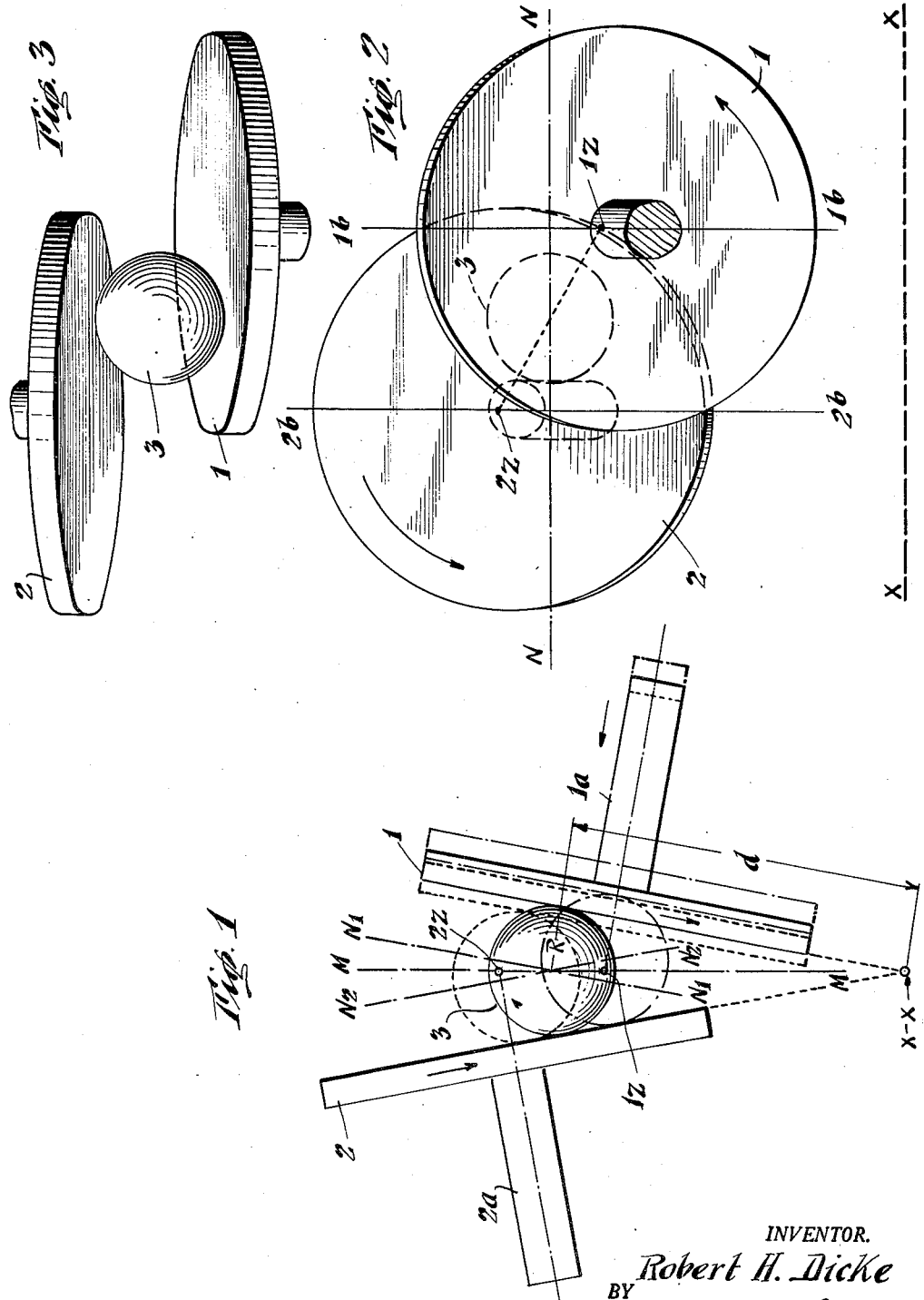
INVENTOR.
Robert H. Dicke
BY
Dicke + Padlon
ATTORNEYS June 27, 1950     R. H. DICKE     2,512,717
POWER TRANSMISSION
Filed Sept. 30, 1948     4 Sheets-Sheet 2
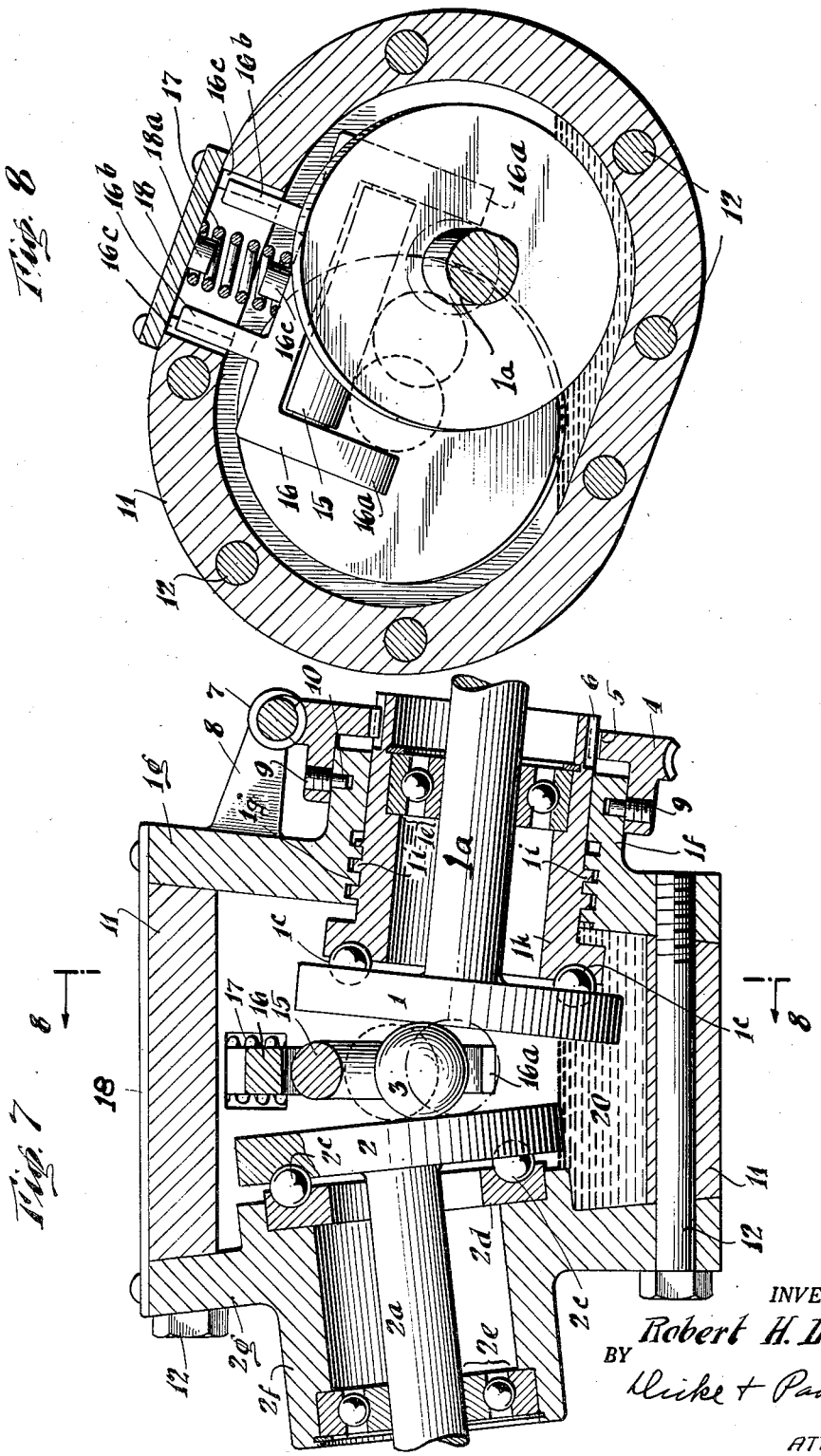
INVENTOR.
Robert H. Dicke
ATTORNEYS June 27, 1950 R. H. DICKE 2,512,717
POWER TRANSMISSION
Filed Sept. 30, 1948 4 Sheets-Sheet 3

INVENTOR.
Robert H. Dicke
BY
ATTORNEYS

June 27, 1950 R. H. DICKE 2,512,717
POWER TRANSMISSION
Filed Sept. 30, 1948 4 Sheets-Sheet 4
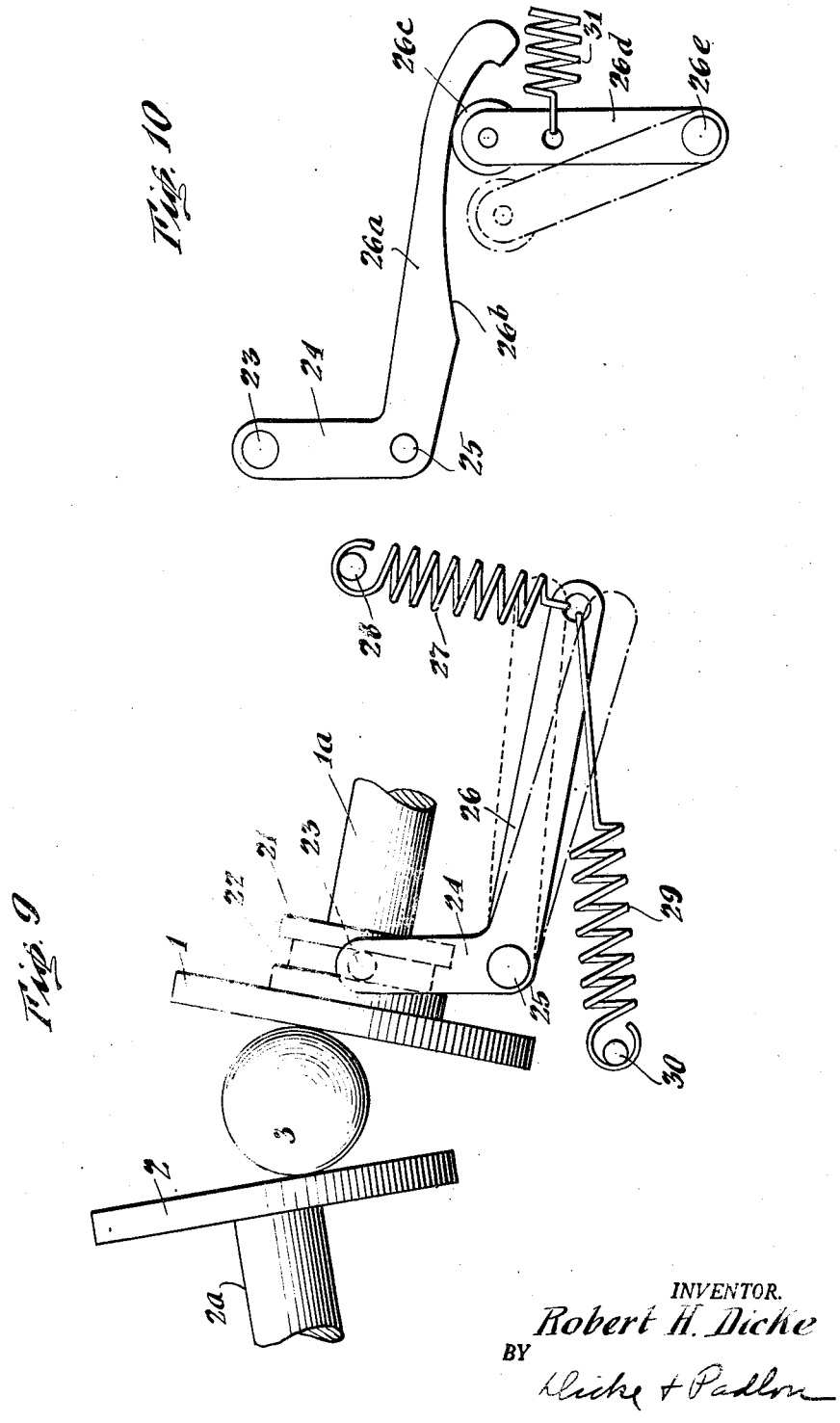
INVENTOR.
Robert H. Dicke
BY
Dicke & Padlon
ATTORNEYS Patented June 27, 1950

2,512,717

UNITED STATES PATENT OFFICE 2,512,717

POWER TRANSMISSION

Robert H. Dicke, Princeton, N. J., assignor of one-half to Allen A. Dicke, Montclair, N. J.

Application September 30, 1948, Serial No. 52,029

14 Claims. (Cl. 74—198)

1

This invention relates to improvements in power transmissions and particularly to transmissions providing infinitely variable drive ratios and comprising a driving friction element and a driven friction element each frictionally engaging a rolling member, such as a ball, compressed between them.

Another object is to provide such devices in which the driving and driven friction surfaces are so related to each other and to the ball between them that the compression forces acting on the ball are directly proportional to the forces acting tangentially on the ball so that the compression forces will never be less than equal, and will never be greatly in excess of the force required to provide the necessary friction to support the forces acting tangentially on the ball.

Another object is to so arrange the driving and driven elements, preferably discs, that the ball will roll to a predetermined distance from the axis of each disc and remain there to provide the desired predetermined drive ratio, which position may be altered at will by adjusting one of the discs axially.

Another object is to provide suitable means for producing such axial adjustment.

Another object is to provide suitable means for such adjustment so arranged that the transmission will adjust itself to provide a constant output torque or a constant input torque.

Another object is to provide suitable means for axial adjustment such that the transmission will adjust itself to provide an output or input torque which varies in a predetermined fashion depending only upon the drive ratio of the transmission.

Another object is to provide a variable speed power transmission with a control lever such that the torque transmitted by one of the two power transmitting shafts is linearly or otherwise proportional to the force applied to the control lever and such that a small motion of the control lever will produce a large change in the transmission ratio.

Another object is to provide means to apply an initial force to the ball to wedge it against the discs as well as means to limit the travel of the ball radially relative to the discs.

With the above and other objects in view, I hereinafter describe a preferred form and several modifications of my invention as shown in the accompanying drawings, in which:

Fig. 1 is a front elevation of the driving and driven discs and the intermediate ball of a transmission illustrating the present invention, certain parts being omitted;

Fig. 2 is a side elevation of the parts of Fig. 1;

Fig. 3 is a plan view of the parts of Figs. 1 and 2;

2

Figure 4:
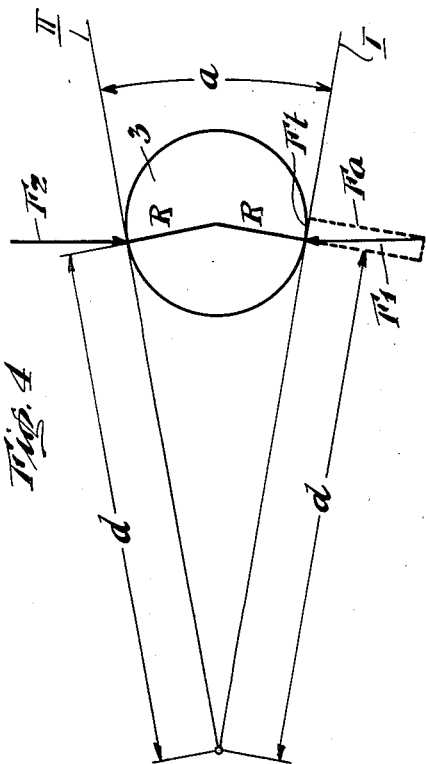
Figure 6B:
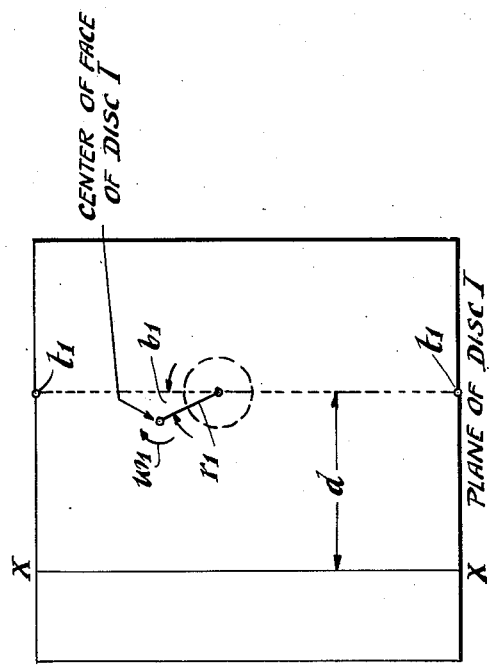
Figure 5:
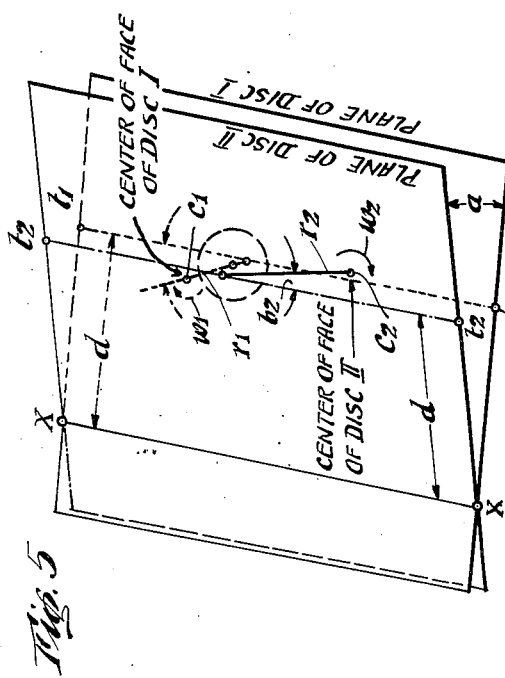
Figure 6A:
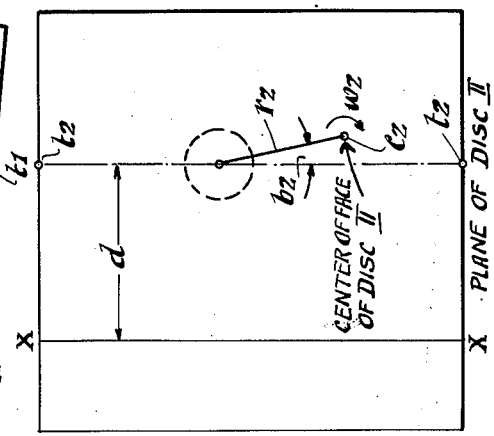

Figs. 4, 5, 6a and 6b illustrate the geometry involved in the devices of the other figures;

Fig. 7 is a front elevation, similar to Fig. 1, of such a transmission, more construction details being shown and certain parts being omitted;

Fig. 8 is a vertical section taken on the line 8—8 of Fig. 7;

Fig. 9 shows another such device with means for automatically adjusting the transmission for constant torque, two springs being used; and Fig. 10 is a fragmentary view of a part of the device of Fig. 9 modified so as to permit the use of only one spring, a cam being used which may be so formed as to automatically vary the transmission ratio in any predetermined manner.

Referring to said drawings, the numerals 1 and 2 designate friction discs. Disc 1 will be considered as the driving disc although it is to be understood that the transmission may be so used that disc 2 is the driving disc. The discs are preferably integral with shafts $1a$ and $2a$, respectively. Said shafts are supported in bearings against radial movement and one of the discs (here disc 2 and shaft $2a$) is supported against axial movement. Disc 1 and shaft $1a$ are also supported for limited axial movement by a suitable thrust bearing and adjusting means, not shown.

The axes of disc 1 and shaft $1a$ lie in a plane $1b$—$1b$ (Fig. 2) and the axes of disc 2 and shaft $2a$ lie in a plane $2b$—$2b$, the planes $1b$—$1b$ and $2b$—$2b$ being parallel and, as shown, being vertical. However, the faces of the discs lie in convergent planes which intersect on the line X—X (Figs. 1 and 2). It will also be noted that the axes of discs 1 and 2 intersect the plane M—M, which bisects the dihedral angle formed by the planes of the faces of the discs, at points $1z$ and $2z$, respectively, which points are not only horizontally displaced from each other, as shown in Fig. 2, but also vertically, as shown in Figs. 1 and 2. N2—N2 represents a plane parallel to the face of disc 2 and spaced therefrom a distance R = the radius of the ball 3 and N1—N1 represents a plane parallel to the face of disc 1 and spaced therefrom the distance R. These planes intersect on the lines N—N (Fig. 2) which is parallel to line X—X. It is obvious that the center of the ball 3 must always lie in the line N—N, while the discs 1 and 2 are in the position shown in full lines in Fig. 1.

As will be discussed in connection with Figs. 4, 5, 6a and 6b, the ball (if not already there) will roll to that position where it lies in the line $1z$—$2z$ in the plane M—M (Fig. 2). There is only one position for the ball where these two requirements are satisfied, viz., when its center lies at the point of intersection of lines N—N and $1z$—$2z$. In the position of the parts shown this is at the point half way between $1z$ and $2z$ where the drive ratio is 1 to 1. It will be noted, however, that if the disc 1 is moved to the left (Fig. 1), as to one of its dotted line positions, the plane N1—N1 is also moved leftward and the line N—N rises. (It also moves slightly to the left, Fig. 1.) This takes the ball center off the line $1z$—$2z$ (Fig. 2) and the ball will, therefore, work to the left (Fig. 2) until it has risen sufficiently to have its center coincide with the new point of intersection of lines N—N and $1z$—$2z$ (which has moved a distance to the left equal to the movement of line N—N to the left (Fig. 1), where it will stay. In this new position the speed ratio (driven to driving disc) will increase. Likewise, when the disc 1 is moved to the right (Fig. 1) the ball will work to a new position (to the right in Fig. 2) and establish a lower speed ratio (driven to driving disc). This may be carried to a point where the center of the ball reaches $1z$, at which time the ball will contact disc 1 at its exact center and the neutral drive ratio will be attained, viz., the driven disc 2 will stand still, irrespective of the speed of rotation of disc 1.

In order that the geometry and kinematics of the invention may be made more clear, reference is made to Figs. 4, 5, 6a and 6b. In said figures, I and II designate the planes which coincide respectively with the planes of the faces of the discs 1 and 2. These planes intersect in the line X—X (as in Fig. 1) forming a dihedral angle of the value $a$. The ball 3, having a radius R, is in tangential contact with each of said planes, and may roll in the trough formed by said planes along the lines $t_1$—$t_1$ and $t_2$—$t_2$, respectively, each parallel to line X—Y. The angle $a$ is somewhat less than twice the angle of repose as between the ball and the disc surface.

It is clear that distance $d = R \cdot \cot \frac{1}{2} a$.

The location of the discs 1 and 2 is preferably so chosen relative to the lines of tangent contact $t_1$—$t_1$ and $t_2$—$t_2$ that the center of the face of disc 1 lies at $C_1$, viz., below the line $t_1$—$t_1$ and the center of the face of disc 2 lies at $C_2$, viz., above the line $t_2$—$t_2$.

The ball 3 is assumed to be located anywhere, but in contact with the disc faces along the lines $t_1$—$t_1$ and $t_2$—$t_2$, and the discs 1 and 2 are assumed to be turning in the direction indicated at an angular velocity of $w_1$ and $w_2$ radians per second, respectively. Then a necessary condition for the ball to remain in contact with the discs is:

$$r_1 w_1 \cos b_1 = r_2 w_2 \cos b_2 \quad (1)$$

The velocity with which the points of contact of the ball with the discs moves along lines $t_1$—$t_1$ and $t_2$—$t_2$ =

$$v = +\tfrac{1}{2}[r_1 w_1 \sin b_1 - r_2 w_2 \sin b_2] \quad (2)$$

The resulting rates of changes of $r_1$ and $r_2$ are respectively:

$$\frac{dr_1}{dt} = v \cdot \cos b_1$$

and $$\frac{dr_2}{dt} = -v \cdot \cos b_2$$

The rates of change of the angles $b_1$ and $b_2$ in radians are $$\frac{db_1}{dt} = -\frac{V}{r_1} \sin b_1$$

and $$\frac{db_2}{dt} = \frac{V}{r_2} \sin b_2$$

As it is desired to know the conditions under which $v = 0$, i. e., where the ball 3 does not change its position in space, Equations 1 and 2 are combined ($v$ being zero), giving the result:

$$b_1 = b_2 \text{ or } b_2 + \pi \text{ rad.}$$

Therefore, the ball is stationary in space only if the angles $b_1$ and $b_2$ are equal or differ by 180 degrees.

With reference to the dynamical aspects of the mechanism, reference is made to Fig. 4. It is assumed that point contact exists between the ball and the disc faces and that the inertia of the ball may be neglected.

$F_1 = -F_2$ and are directed toward each other through the points of contact of the ball with the discs. The result is that the total force acting on the ball is zero and the torque on the ball is zero.

The forces $F_1$ and $F_2$ acting on the ball have counterparts in forces which the ball exerts on the discs. These forces, having the same magnitude as $F_1$ and $F_2$ have components $Fa$ acting parallel to the axes of the discs 1 and 2 and components $Ft$ tangential to the ball, causing torques to be applied to the discs.

$$Fa = F \cos \tfrac{1}{2} a$$

and $$Ft = F \sin \tfrac{1}{2} a$$

viz., the ratio of these forces is independent of all parameters except the value of the dihedral angle $a$.

The torques which the force F produces about the axes of discs 1 and 2 are:

$$T_1 = -F \sin \tfrac{1}{2} a r_1 \cos b_1$$
$$T_2 = -F \sin \tfrac{1}{2} a r_2 \cos b_2 \quad (3)$$

Ignoring friction, the power fed by disc 1 to the ball =

$$P_1 = -T_1 w_1$$

and by the ball to disc 2

$$P_2 = +T_2 w_2$$

Ignoring kinetic energy in the parts:

$$P_1 = P_2 \text{ and } T_1 w_1 = T_2 w_2$$

Referring now to the form of construction shown in Figs. 7 and 8, the parts to which reference numerals were assigned in Figs. 1, 2, and 3 are designated by the same reference numerals. Disc 1 and its shaft $1a$ are considered as the driving member and disc 2 and its shaft $2a$ as the driven member, although it is to be understood that disc 2 may be the driving member and disc 1 the driven. $2c$ indicates the balls of a ball thrust bearing operating in grooves in disc 2 and in grooves in the ball race $2d$. This bearing is preferably so constructed as to act also as a radial bearing. $2e$ represents a radial bearing mounted on shaft $2a$. $2f$ indicates a hub on side plate $2g$, the hub and side plate serving to support bearings $2e$ and thrust bearing race $2d$. Similarly, $1c$ represents the balls of a ball thrust bearing, which balls operate in grooves on the rear face of disc 1 and in grooves on an adjustable bearing sleeve $1h$, the interior of which supports the exterior of the radial bearing $1e$ carried on shaft $1a$.

The exterior of bushing $1h$ is formed with threads $1i$ which interengage with threads $1j$ formed on the interior of side plate $1g$. It will be noted that if bushing 1h is rotated, the disc 1 will be adjusted axially; such rotation of bushing 1h may be effected by means of a worm wheel 4 having internal teeth 5 engaging in recesses 6 formed on the bushing 1h. The worm wheel 4 may be rotated as required by worm 7 mounted in bearings formed on brackets 8 supported upon the side plate 1g. The worm 4 may be held against axial movement by means of screws 9 having extensions operating in a groove 10 formed in the hub 1f attached to side plate 1g.

The purpose of the splined connection 5, 6 is to permit axial movement of the bushing 1h without corresponding axial movement of the worm 4.

The side plates 1g and 2g are held in proper relation by means of a tubular spacing member 11 which is so formed that the discs 1 and 2 are held at the proper angle to each other. The side plates 1g and 2g and the spacer 11 are held together by a series of bolts 12.

In order for a device of this type to operate properly it is desirable that the ball 3 be placed into wedging relationship with discs 1 and 2 by a certain, relatively small, initial force. This is desirable even when the parts are in the position such as that shown, when its weight is adequate for this purpose. It is essential, however, when the transmission is in a position such that the weight of the ball does not tend to wedge it between the discs. To provide such initial force, a constraining member, such as roller 15, is provided. This may be supported in a U-shaped supporting frame 16 having limbs 16a which serve to support the bearings for the roller and also act as limit stops for the movement of the ball. Since the ball movement is in an inclined direction, it is desirable to have the roller and its support inclined accordingly.

The support frame 16 may be mounted for straight line movement by means of arms 16b operating in slots 16c in the spacer 11 and a spring 17 is provided to press the roller 15 upon the ball.

In order to permit viewing of the interior, a removable plate 18 is preferably provided. In the form shown, this plate is provided with a stud 18a which serves to align the spring 17. The other end of the spring may surround a stud 16c on the member 16.

In the position of the parts shown in Figs. 7 and 8 the ball is in the central position, viz., so that its points of engagement are equally distant from the centers of discs 1 and 2, thus providing a one to one drive ratio. It will be seen that if the worm 7 is rotated in such a direction as to cause the disc 1 to be moved toward the left (Fig. 7), the ball will be forced upwardly and will therefore travel to the left (Fig. 8), establishing a higher drive ratio (driven to driving shaft) and that if the adjustment is reversed the disc 1 will move to the right (Fig. 7) and the ball will drop and will run toward the right (Fig. 8), establishing a lower drive ratio (driven to driving shaft). This may be continued until the contact of ball 3 with disc 1 is at the center of said disc, at which time disc 2 and its shaft 2a will not rotate irrespective of the speed of rotation of disc 1.

20 indicates a lubricating fluid into which at least one of the discs is submerged. This causes the parts to be properly lubricated and reduces the noise of operation. This fluid is preferably of low film strength so that it may be easily displaced from between the ball 3 and the faces of discs 1 and 2. Since the area of contact between ball 3 and the discs is infinitesimally small, even a small compressive force acting therebetween will generate extremely high pressure which disrupts the lubricating film and increases the co-efficient of friction between the ball and the friction disc faces.

While the means shown and described for adjusting the disc 1 axially is of the irreversible type, on occasion, it will be desirable to make the action reversible. In such cases, anti-friction means, such as balls, may be introduced between the threads 1i and 1j and the bushing 1h adjusted rotarily by other means, such as a lever. If this is done, it is possible to more easily provide for an automatic torque response, as will be described hereinafter with reference to Figs. 9 and 10.

Referring to Fig. 9, the disc 2 is assumed to be mounted against axial movement, whereas the disc 1 and its shaft 1a may be adjusted axially. This may be accomplished by the more or less schematic construction shown in which the disc 1 and shaft 1a carry a hub 21 having a groove 22 within which operate pins or shoes 23 supported on lever 24 pivoted at 25. Attached to lever 24 is an arm 26 to the end of which is attached a spring 27 anchored at 28 upon an abutment which is preferably adjustable to vary the tension of spring 27. Assuming that spring 27 obeys Hooke's law, the extension of spring 27 and therefore the axial movement of disc 1 would be proportional to the tangential force acting upon the ball 3 since that force is proportional to the compressive force acting upon the ball. Since the ball 3 is at varying distances from the center of the face of disc 1, the extension of spring 27 would not be a measure of the torque acting on shaft 1a, since such torque is a function of the distance from the point of ball contact on the disc 1 to its center. In order to achieve the desired torque response (not necessarily a linear response), it may be desirable to provide a second spring, such as 29, attached at one end to arm 26 and at its other end to the abutment 30, preferably adjustably located. In the position shown, spring 29 opposes the action of spring 27 by imposing a clockwise torque on arm 26. As the spring 27 is extended, spring 29 is collapsed and its force decreases. At the same time, the axis of spring 29 will recede from pivot 25 so that its torque on arm 26 does not decrease as rapidly as the tension in spring 29. This action can be varied by changing the amount of initial tension in springs 27 and 29. Furthermore, by suitable selection of centers, lengths of arms 24 and 26, and the location of abutments 28 and 30, any desired torque response may be achieved, including a substantially linear response.

Fig. 10 illustrates a modification of the device shown in Fig. 9, in which the arm 26a has its lower edge formed as a cam surface 26b against which bears a roller 26c carried on arm 26d pivoted at 26e. Said arm is biased clockwise by means of a spring 31 attached to arm 26d at one end and having its other end attached to an adjustable abutment, not shown. The cam face 26b can be readily so shaped as to give any desired torque response, including a linear response.

If disc 1 is the driving disc, the adjustment will be such as to maintain the desired relationship of input torque. It is, of course, to be understood that if disc 1 is regarded as the driven member, the output torque will be controlling.

It will be noted that the constructions shown

I claim:

1. In a power transmission, a driving friction disc and a driven friction disc each supported by bearings in such a way that the faces of said discs form a dihedral angle, a ball free to rotate between and in contact with said discs, the centers of rotation of said discs being located at different distances from the vertex of said dihedral angle.

2. In a power transmission, a driving friction disc and a driven friction disc each supported by bearings in such a way that the faces of said discs form a dihedral angle, a ball free to rotate between and in contact with said discs, the axes of said discs intersecting the planes of their respective faces at different distances from the vertex of said dihedral angle.

3. In a power transmission, a driving friction disc and a driven friction disc each supported by bearings in such a way that the faces of said discs form a dihedral angle, a ball free to rotate between and in contact with said discs, the centers of rotation of said discs being located at different distances from the vertex of said dihedral angle, one center being further from the vertex than the line of contact of the ball with said disc and the other center being nearer to said vertex than the line of contact of the ball with the second disc.

4. In a power transmission, a driving friction disc and a driven friction disc each supported by bearings in such a way that the faces of said discs form a dihedral angle, a ball free to rotate between and in contact with said discs, the centers of rotation of said discs being located at different distances from the vertex of said dihedral angle and means for adjusting the position of at least one of said discs axially whereby the ball will roll to definite positions radially of said discs to establish different speed ratios between the discs.

5. In a power transmission, a driving friction disc and a driven friction disc each supported by bearings in such a way that the faces of said discs form a dihedral angle, a ball free to rotate between and in contact with said discs, the centers of rotation of said discs being located at different distances from the vertex of said dihedral angle and means for adjusting the position of at least one of said discs axially whereby the ball will roll to definite positions radially of said discs to establish different speed ratios between the discs, said adjusting means comprising a helical means.

6. In a power transmission, a driving friction disc and a driven friction disc each supported by bearings in such a way that the faces of said discs form a dihedral angle, a ball free to rotate between and in contact with said discs, the centers of rotation of said discs being located at different distances from the vertex of said dihedral angle, and means for adjusting the position of at least one of said discs axially whereby the ball will roll to definite positions radially of said discs to establish different speed ratios between the discs, and spring means tending to move said friction discs toward each other.

7. In a power transmission, a driving friction disc and a driven friction disc each supported by bearings in such a way that the faces of said discs form a dihedral angle, a ball free to rotate between and in contact with said discs, the centers of rotation of said discs being located at different distances from the vertex of said dihedral angle, and means for adjusting the position of at least one of said discs axially whereby the ball will roll to definite positions radially of said discs to establish different speed ratios between the discs, and spring means tending to move said friction discs toward each other, said spring means being so arranged that progressively more force is applied by the spring means to the adjustable disc as the discs are separated but at a progressively decreasing rate of increase.

8. In a power transmission, a driving friction disc and a driven friction disc each supported by bearings in such a way that the faces of said discs form a dihedral angle, a ball free to rotate between said discs and spring biased means engaging said ball and tending to press it toward the vertex of said dihedral angle.

9. In a power transmission, a driving friction disc and a driven friction disc each supported by bearings in such a way that the faces of said discs form a dihedral angle, a ball free to rotate between said discs and spring biased means engaging said ball and tending to press it toward the vertex of said dihedral angle, said biased means being a roller.

10. In a power transmission, a driving friction disc and a driven friction disc each supported by bearings in such a way that the faces of said discs form a dihedral angle, a ball free to rotate between and in contact with said discs, in such a way that the points of possible contact of the ball with the discs form lines of contact on the face of each disc equidistant from the vertex line of said dihedral angle, and means for moving at least one of said discs axially in such a way that the lines of possible contact of the ball with the discs are shifted.

11. In a power transmission, a driving friction disc and a driven friction disc each supported by bearings in such a way that the faces of said discs form a dihedral angle, a ball free to rotate between and in contact with said discs in such a way that the points of possible contact of the ball with the discs form lines of contact on the face of each disc equidistant from the vertex line of said dihedral angle, and means for moving at least one of said discs relative to the other in such a way that the lines of possible contact of the ball with the discs are shifted.

12. The combination according to claim 8 in which the biased means comprises a roller mounted for rotation with its axis generally parallel to the vertex of said dihedral angle.

13. The combination according to claim 8 in which the biased means comprises a roller mounted for rotation with its axis generally parallel to the vertex of said dihedral angle, said roller extending from at least the center of one disc to near the periphery of said disc.

14. The combination according to claim 8 in which the biased means comprises a roller mounted for rotation with its axis generally parallel to the vertex of said dihedral angle, said roller extending from at least the center of one disc to near the periphery of said disc and being journalled in a carrier which is movable in a direction toward and from said vertex, spring means being provided to bias said carrier and roller toward said vertex.

ROBERT H. DICKE.

(References on following page)

REFERENCES CITED

The following references are of record in the file of this patent:

UNITED STATES PATENTS

| Number | Name | Date |
|---|---|---|
| 1,803,834 | Bates | May 5, 1931 |
| 2,209,254 | Ahnger | July 23, 1940 |

FOREIGN PATENTS

| Number | Country | Date |
|---|---|---|
| 606,919 | France | Mar. 20, 1926 |
| 788,778 | France | Aug. 5, 1935 |
| 815,862 | France | Apr. 19, 1937 |